Sept. 16, 1930.   R. L. SMITH   1,776,238
METHOD OF AND MECHANISM FOR STOPPING ROTARY SHAPER SPINDLES
Filed April 27, 1929   3 Sheets-Sheet 1

INVENTOR:
Robert L. Smith
BY Robt.P.Hains
ATTORNEY

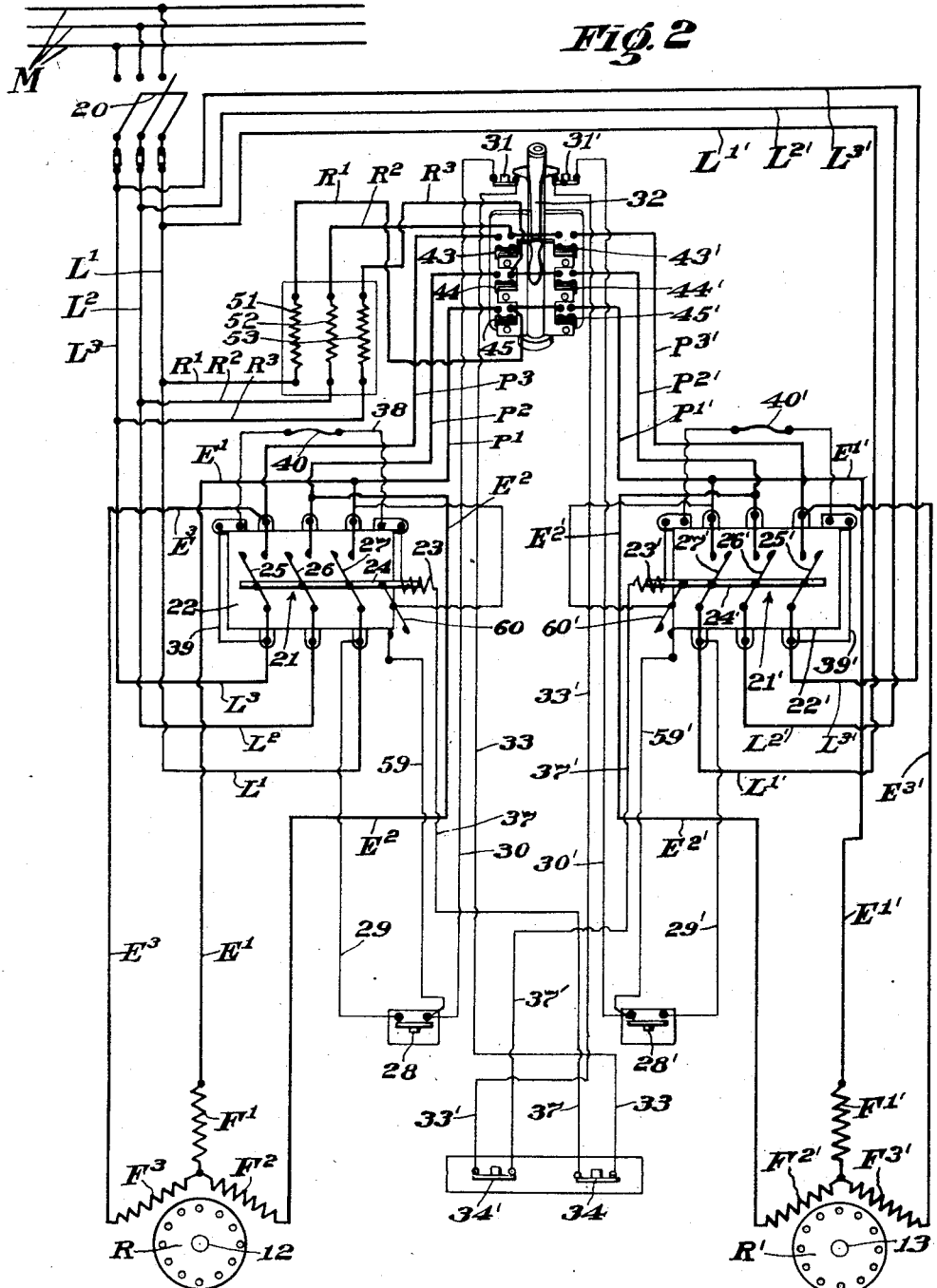

Sept. 16, 1930.  R. L. SMITH  1,776,238
METHOD OF AND MECHANISM FOR STOPPING ROTARY SHAPER SPINDLES
Filed April 27, 1929   3 Sheets-Sheet 3
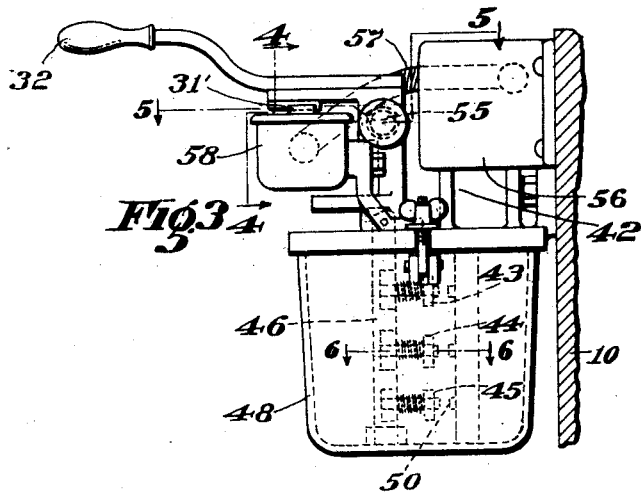
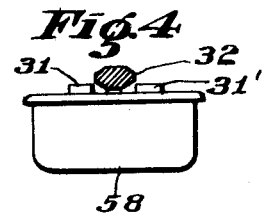
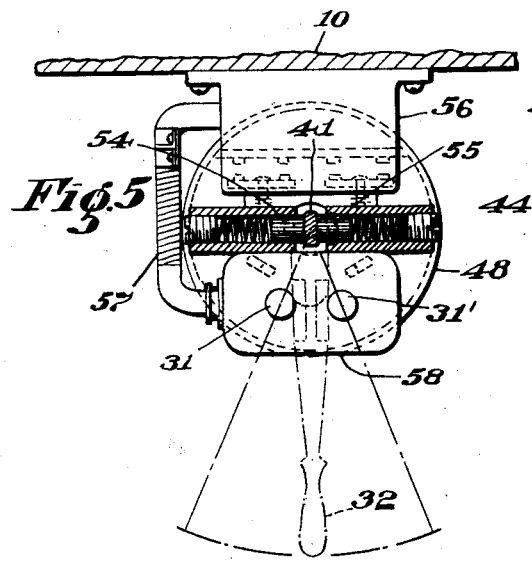
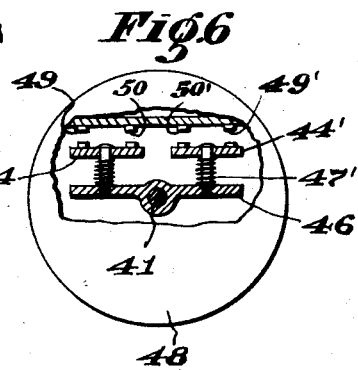
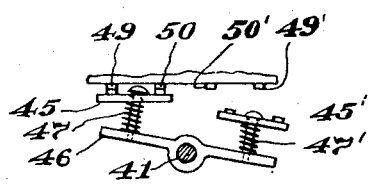
INVENTOR:
Robert L. Smith
BY Rob H. Hains
ATTORNEY Patented Sept. 16, 1930

1,776,238

UNITED STATES PATENT OFFICE

ROBERT L. SMITH, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS

METHOD OF AND MECHANISM FOR STOPPING ROTARY SHAPER SPINDLES

Application filed April 27, 1929. Serial No. 358,683.

This invention relates to wood working machinery, and more particularly to a method of and mechanism for arresting the rotation of shaper spindles.

Woodworking shapers as commonly constructed are provided with a work supporting table upon which the work rests while it is moved into engagement with a revolving cutter that is secured to and driven by a vertical shaft or spindle.

These cutter spindles are relatively heavy, are supported by antifriction bearings to rotate with a minimum amount of friction and are driven at high speed (usually in excess of 5000 R. P. M.); it therefore follows that a spindle will continue to rotate for a considerable length of time after the driving power has been cut off. This delay in a cutter-spindle to come to rest after the power has been cut off is objectionable and necessitates the loss of time on the part of the machine attendant when a cutter is to be changed or other operations are to be performed but which cannot be attended to until the cutter shaft has stopped rotating.

It has been proposed heretofore to associate mechanical or friction brakes with shaper spindles to check their rotation but these brake elements tend to wear out rapidly as a result of the extremely high speed of the cutter spindle and are otherwise unsatisfactory.

In some constructions the shaper spindle is driven by a pulley secured to the spindle, but in many cases a direct motor drive is employed and highly satisfactory results are secured through the employment of an induction motor the rotor of which is mounted upon the shaper spindle, so that the cutter and the rotor of the operating motor are supported by the same shaft. The squirrel cage type of induction motor is generally employed since its use avoids the need of contact brushes associated with the rotor, and this type of motor will operate at any desired speed depending upon the number of poles of the motor and the frequency of the current supplied.

The present invention contemplates a method and construction whereby the induction type of electric motor such as has been employed heretofore to drive a shaper spindle may be also employed to check or arrest the spinning of the cutter shaft after the driving power has been cut off.

In carrying out the present invention a switch, such for example as a manually or magnetically controlled reversing switch, is introduced in the circuit leading to the induction motor so that this switch will serve to temporarily change the order in which the fields of the stator are excited to thereby cause the magnetic fields to rotate in the opposite direction from that of the spinning spindle, and as a result a strong retarding or braking action is exerted upon the spindle which will bring it to rest quickly. In this manner the rotation of the spindle is arrested without the use of mechanical braking elements which will heat up and wear out rapidly.

In most cases the current employed to brake the rotating spindle should be less than the full line current employed to drive the motor, and another feature of the invention resides in a construction in which resistors are employed to reduce the current supplied to the motor by the reversing switch.

Still another feature of the invention resides in a construction having a manually operable lever which may be shifted to first cut off the driving current to the motor, and then actuate a switch to reverse the direction of rotation of the magnetic fields. In shapers employing a pair of spindles the manually operable lever may be shifted in one direction to arrest the rotation of one spindle and in the opposite direction to arrest the rotation of the other spindle.

The various features of the invention and novel arrangement of parts will be better understood from the following description when read in connection with the accompanying drawings wherein:—

Fig. 2 is a diagrammatic view of the wiring employed in the shaper of Fig. 1 to control the right and left spindles;

Fig. 3 is a side elevation of the reversing switch and associated mechanism;

Fig. 4 is a sectional view taken on the line 4—4 of Fig. 3;

Fig. 5 is a sectional view taken on the line 5—5 of Fig. 3;

Fig. 6 is a sectional view taken on the line 6—6 of Fig. 3; and

Fig. 7 shows the switch of Fig. 6 shifted in one direction to its closed position.

Figure 1:
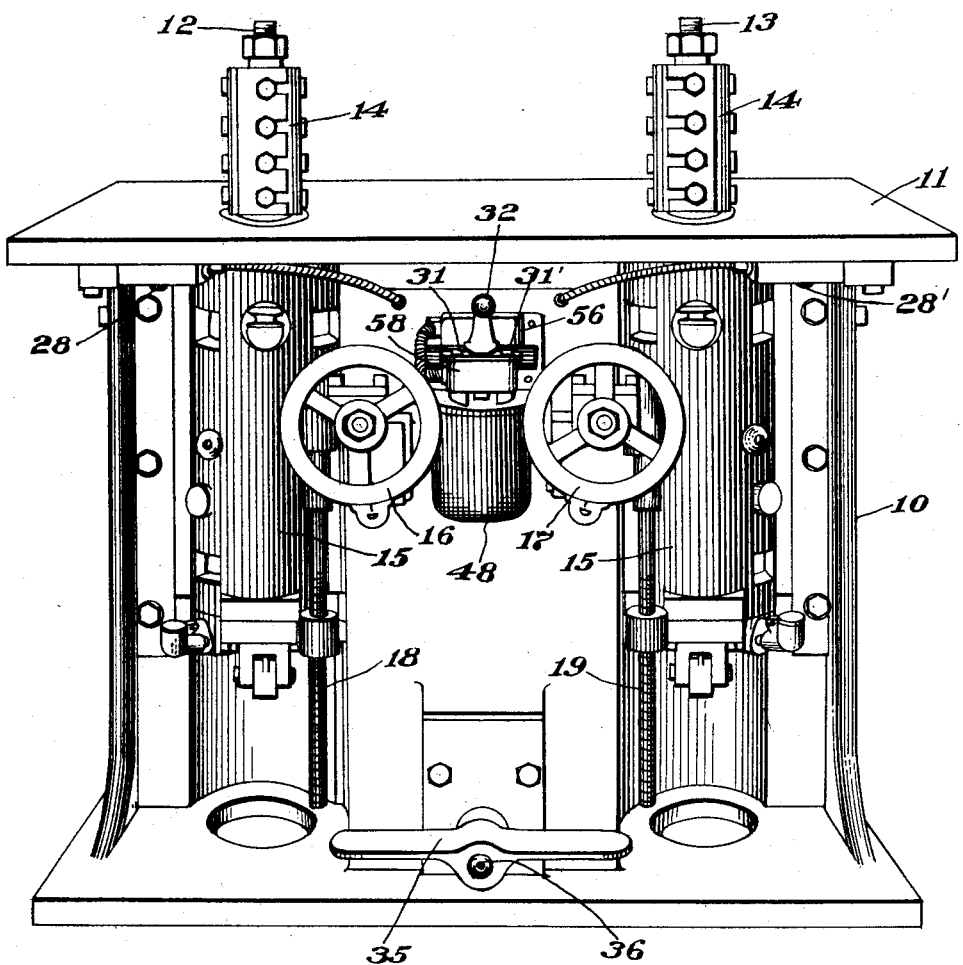
Fig. 1 is a perspective view of a double spindle shaper provided with the braking mechanism of the present invention.

The electric braking mechanism of the present invention for shaper spindles may be employed in connection with a single spindle machine, or with a double spindle machine as shown.

The double spindle shaper shown in Fig. 1 may for the most part be of well known construction and consists of the supporting frame 10 having the usual work supporting table 11 provided with the left cutter spindle 12 and the right cutter spindle 13, each of which spindles has the usual cutter 14.

The spindles 12 and 13 are driven by induction motors of the well known squirrel cage type, the three-phase type being shown in Fig. 2. The stator of each motor is mounted in a housing 15 that is part of the yoke or slide employed to support the cutter spindle for vertical adjustment. The desired vertical adjustment of the spindles 12 and 13 is obtained by rotating the hand wheels 16 and 17 respectively to operate the adjusting screws 18 and 19. The rotor of each motor is mounted on the spindle which it operates.

The mechanism so far described is or may be of well known construction and operates in a well known manner to shape or dress wood presented to the cutters 14, one cutter being driven in a clockwise direction, and the other in a counter-clockwise direction.

In carrying out the present invention for braking or retarding the rotation of a spindle after the power has been cut off, it is not necessary to make changes in the type of induction driving motor employed heretofore, since the desired braking action may be produced by simply reversing the direction of rotation of the magnetic fields. Various constructions may be employed for temporarily changing the order of exciting the motor fields to thereby reverse the direction in which the magnetic fields rotate, and one good practical form of switch mechanism and wiring to this end will now be described.

Referring to Fig. 2 of the drawing, M designates an alternating current supply line for delivering three-phase currents to the spindle operating motors. The induction motor for driving the cutter spindle 12 is provided with the current supply wires $L^1$, $L^2$, $L^3$, which may be connected to the main line M by closing the switch 20. The wires $L^1$, $L^2$, $L^3$, leads to a magnetically controlled switch 21 mounted upon the switch board 22. The switch 21 is closed by exciting the magnet 23 to cause it to pull the armature 24 in a right-hand direction to thereby close the switch elements 25, 26, 27. The switch 21 will be held closed as long as the magnet 23 is excited but will open automatically as soon as the current in the magnet circuit is cut off.

When the switch 21 is closed the current supplied to the switch elements 25, 26, 27 by the wires $L^1$, $L^2$, $L^3$ will be conducted to the wires $E^1$, $E^2$, $E^3$ respectively and will travel along these wires to the fields $F^1$, $F^2$, $F^3$ respectively of the induction motor for the spindle 12. The current thus supplied to this motor will excite the fields $F^1$, $F^2$, $F^3$ in the order mentioned and thereby produce rotating magnetic fields to rotate the rotor R and cutter spindle 12 in a well known manner.

The switch 21 is closed by operating a starting button 28 mounted under the front edge of the table 11. When the switch 28 is closed current flows from the wire $L^1$ through the wire 29 to the switch 28 and from this switch through the wire 30 to a normally closed switch 31 that is under the control of the current reversing lever 32. The current passes from the closed switch 31 along the wire 33 to a stop button 34 operated by a foot treadle 35 pivoted at 36 (see Fig. 1). The current then passes from the closed switch 34 through the wire 37 to the magnet coil 23 and excites the magnet to close the switch 21. The current passes from the magnet coil 23 along the wires 38 and 39 to the wire $L^3$. The wire 38 is shown as having a fuse 40 adapted to open the switch 21 in case of overload. In practice, however, it is desirable to employ a thermal relay of well known construction in place of the fuse 40.

The wiring so far described, with the exception of the switch 31, has been employed heretofore in operating direct motor driven shaper spindles and has the advantage that when the motor once stops through failure of current or opening of a switch, it will not start again until the starting button 28 is actuated. The motor can be stopped by operating the foot treadle 35 to open the switch 34 but this will allow the spindle 12 to coast or spin a considerable length of time before coming to rest.

The coasting or spinning is prevented in accordance with the present invention by subjecting the rotor R to an electrical brake action produced by reversing the direction in which the electrical fields rotate. This may be accomplished by various forms of either automatically or manually controlled switches and is secured, in the construction shown, through a reversing switch having the rocking shaft 41 to which the operating lever 32 is rigidly secured. The shaft 41 is journaled upon a supporting frame 42 secured to the main frame 10. The reversing switch illustrated is employed to control the braking force upon both of the cutter spindles 12 and 13 and therefore has the double construction shown, one set of switch elements 43, 44, 45 being provided to control the braking action upon the spindle 12 and the other set of elements 43', 44', 54' being employed to control the spindle 13. The switch elements just mentioned are carried by the bridge plate 46 formed of insulating material and springs 47 are provided to hold the switch elements against their cooperating contacts. The switch construction just described may be enclosed in the receptacle 48 and immersed in oil confined in this receptacle.

When it is desired to quickly stop one of the cutters 14, for example, that operated by the spindle 12, the lever 32 is shifted to the left (Fig. 2). This causes a projection upon the lever 32 to open the switch 31, thus cutting off the current to the magnet coil 23 so that the switch 21 will open to cut off the driving current to the motor fields $F^1$, $F^2$, $F^3$. Further movement of the lever 32 to the left will cause the switch elements 43, 44, 45 to bridge the gap between their contacts 49, 50, as will be apparent from Fig. 7; this serves to change the order in which the fields $F^1$, $F^2$, $F^3$ are excited to thereby reverse the direction of rotation of the magnetic fields.

When the switch 21 is open and the lever 32 is moved to the left to close the reversing switch, current will flow from the wires $L^1$, $L^2$, $L^3$ through the wire $R^1$, $R^2$, $R^3$, to the resistors 51, 52, 53 adapted to reduce the current, and then through the second set of wires $R^1$, $R^2$, $R^3$ to the contacts 50, the wires being arranged so that $R^1$ leads to the switch element 45, $R^2$ leads to 43, and $R^3$ leads to 44. The current then passes from the contacts 49 along the wires $P^1$, $P^3$, $P^2$ to the wires $E^1$, $E^3$, $E^2$ respectively leading to the fields $F^1$, $F^3$, $F^2$. That is the current supplied to the motor is now reversed so that the fields are excited in the order $F^1$, $F^3$, $F^2$, thereby reversing the direction in which the magnetic fields revolve, and the strength of the current is reduced by the resistors 51, 52, 53. In this manner a strong braking action is exerted on the rotating spindle 12 and as soon as it stops rotating the hand lever 32 is released to return automatically to its central or inactive position.

The lever 32 is continuously urged toward its central position in which it is shown in dotted lines in Fig. 5 by the spring pressed plungers 54, 55, acting against the opposite flat faces of the switch shaft 41. Associated with the reversing switch described is the inlet box 56 which is connected by the conductor cable 57 to the box 58 containing the lever controlled switches 31, 31'.

The mechanism for controlling and stopping the motor for the right-hand spindle 13 is identical in construction to that above described for controlling the spindle 12 and the same reference characters have been used to designate the electrical control for the right and left spindles except a prime (') has been added to each reference character used in connection with the electrical control for the right spindle.

It will be apparent from the foregoing that the spindle 12 may be driven by pressing the start button 28 and the spindle 13 is started by pressing the start button 28'. The current to one motor may be cut off by rocking the foot treadle in one direction, and the current for the other motor is cut off by rocking the treadle in the opposite direction. If it is desired to quickly stop the rotation of the spindle 12 it is merely necessary to rock the lever 32 to the left and hold it in this position until the spindle comes to rest, and if it is desired to quickly stop the spindle 13 the lever 32 is rocked to the right. In this manner the rotation of either spindle may be quickly arrested without employing a mechanical brake the elements of which tend to heat up and wear out rapidly.

While a reversing switch has been shown and described it will be understood that practically any type of switch may be employed that will serve to reverse the direction in which the magnetic fields of the motor rotate.

It is desirable that the start button switch 28 be so constructed that if the motor controlled thereby once stops due to any cause it will not start up again until the button switch 28 is again manually actuated. This is accomplished by so constructing the switch 28 that it will open when the manual pressure upon the same is released. As soon as this switch is closed current passes along the wires 29, 30 to excite the magnet coil 23 and close the switch 21. This closes the switch or interlock 60 whereupon current will flow along the wires 59, 30 to keep the coil 23 excited while the switch 28 remains open.

When the present invention is employed in connection with a shaper having a single cutter shaft the switch elements 43', 44', 45' may be omitted or a stop may be employed to arrest the movement of the lever 32 in one direction.

What is claimed is:—

1. In a wood working shaper, in combination, a cutter spindle, an induction motor for driving the spindle and having its rotor secured to the spindle, a magnetic switch for controlling the current supplied to the motor, a push button switch for closing the magnetic switch and a second push button switch for opening the magnetic switch, a manually controlled reversing switch having an operating lever, and means operable by said lever to first actuate said magnetic switch to cut off the driving current to the motor and then supply current to the fields of the stator in a different order to cause the magnetic fields to rotate in the reverse direction and thereby exert a braking or retarding action upon the spinning spindle.

2. In a wood working shaper, in combination, a cutter spindle, an induction motor for driving the spindle and having its rotor secured to the spindle, a switch for controlling the current supplied to the stator of the motor, a reversing switch having an operating lever, means operable by said lever to first actuate the first mentioned switch to cut off the driving current to the motor stator and then supply current to the fields of the stator in a different order to cause the magnetic fields to rotate in the reverse direction and thereby exert a braking or retarding action upon the spinning spindle, and resistors for reducing the current supplied to the motor stator through the reversing switch.

3. In a wood working shaper, in combination, a right hand cutter spindle and a left hand cutter spindle, induction motors for driving the spindles and each motor having its rotor secured to a spindle, a pair of switches one for controlling the current to each motor, a manually operable reversing switch constructed to be moved in one direction to actuate one of said switches to cut off the driving current to one motor and then supply current to the fields of that motor in a different order to cause the magnetic fields to rotate in the reverse direction and thereby exert a braking action on the spindle, and the manually operable switch being movable in the opposite direction to operate the other switch to cut off the driving current to its motor and then supply current to the fields of that motor in a different order to reverse the direction of rotation of its magnetic fields.

4. In a wood working shaper, in combination, a cutter spindle, an induction motor for driving the spindle and having its rotor secured to the spindle, a magnetic switch for controlling the currents supplied to the stator of the motor, a reversing switch provided with manually controlled means operable to first actuate said magnetic switch to cut off the driving current to the motor stator and then supply current to the fields of the stator in a different order to cause the magnetic fields to rotate in the reverse direction and exert a braking or retarding action upon the spinning spindle, and resistors for reducing the current supplied to the motor stator through the reversing switch.

5. In a wood working shaper, in combination, a cutter spindle, an induction motor for driving the spindle and having its rotor secured to the spindle, a switch for controlling the current supplied to the stator of the motor, a reversing switch, means associated therewith to first actuate the first mentioned switch to cut off the driving current to the motor stator and then close the reversing switch to supply current to the fields of the stator in a different order to cause the magnetic fields to rotate in the reverse direction and exert a braking or retarding action upon the spinning spindle, and resistors controlled by the reversing switch and adapted to reduce the current supplied to the stator by the reversing switch.

6. In a wood working shaper, in combination, a right hand cutter spindle and a left hand cutter spindle, induction motors for driving the spindles and each motor having its rotor secured to a spindle, a pair of magnetic switches one for controlling the current to each motor, a pair of reversing switches for the motors, a rocking lever for controlling said switches and adapted to be shifted in one direction to cut off the current supply to one motor by a magnetic switch and then close the reversing switch to supply current to the fields of the motor in a different order to cause the magnetic fields to rotate in the reverse direction and exert a braking or retarding action upon the spinning spindle, and said rocking lever being movable in the opposite direction to first open the magnetic switch for the other motor and then close the reversing switch for that motor to arrest its rotation.

In testimony whereof, I have signed my name to this specification.

ROBERT L. SMITH.